United States Patent
Desai

(10) Patent No.: US 7,111,508 B2
(45) Date of Patent: Sep. 26, 2006

(54) TIRE SENSOR LOCALIZATION UTILIZING SPEED CORRECTED FREQUENCY

(75) Inventor: Tejas B. Desai, Sterling Heights, MI (US)

(73) Assignee: Siemens VDO Automotive Corporation, Auburn Hills ( * ) Notice: Subject to any disclaimer, the term of this patent is extended or adjusted under 35 U.S.C. 154(b) by 0 days.

(21) Appl. No.: 11/153,027

(22) Filed: Jun. 15, 2005

(65) Prior Publication Data

US 2005/0229693 A1    Oct. 20, 2005

Related U.S. Application Data

(62) Division of application No. 10/431,857, filed on May 8, 2003, now Pat. No. 6,972,672.

(60) Provisional application No. 60/394,180, filed on Jul. 3, 2002.

(51) Int. Cl.
*B60C 23/04* (2006.01)
(52) U.S. Cl. ................ 73/146.4; 340/444
(58) Field of Classification Search ............ 73/146, 73/146.2, 146.3, 146.4, 146.5; 340/438, 340/442, 443, 444, 445, 447
See application file for complete search history.

(56) References Cited

U.S. PATENT DOCUMENTS

| | | | | |
|---|---|---|---|---|
| 5,573,611 A | * | 11/1996 | Koch et al. | 340/447 |
| 5,963,128 A | * | 10/1999 | McClelland | 340/447 |
| 6,215,393 B1 | | 4/2001 | Delaporte | |
| 6,448,892 B1 | | 9/2002 | Delaporte | |
| 6,463,798 B1 | * | 10/2002 | Niekerk et al. | 73/146.2 |
| 6,505,515 B1 | | 1/2003 | Delaporte | |
| 6,604,416 B1 | * | 8/2003 | Tsujita | 73/146.5 |
| 6,693,522 B1 | * | 2/2004 | Tang et al. | 340/445 |
| 6,696,935 B1 | * | 2/2004 | Bonardi et al. | 340/447 |

* cited by examiner

*Primary Examiner*—Eric S. McCall

(57) ABSTRACT

A method of localizing the location of a received signal from a tire pressure sensor includes sending an AM identification signal. The AM signal is adjusted for speed such that the frequency of the signal equals a constant multiplied by the speed of the vehicle. Each of the tire locations on a vehicle have an expected sequence of black-out points in the signal received by a receiver at any point on the vehicle. That is, given a particular vehicle design, the AM signal described above would be received at a receiver with an expected sequence of received peaks and black-out points. Since the frequency of the signal is adjusted for speed, the received signal will accurately allow the location of black-out points to be utilized to identify the tire location for a particular signal.

7 Claims, 1 Drawing Sheet

TIRE SENSOR LOCALIZATION UTILIZING SPEED CORRECTED FREQUENCY

The present invention claims priority to U.S. Provisional Patent Application Ser. No. 60/394,180 filed on Jul. 3, 2002.

BACKGROUND OF THE INVENTION

This invention relates to the use of a signal being transmitted from tire pressure sensors wherein a signal is adjusted to have a frequency corrected for the speed of the vehicle. A control receives the signal and identifies characteristics in the signal to identify which tire has sent the signal.

Modern vehicles are being provided with more and more electronic diagnostic and sensing systems. In particular, tire pressure sensors are now incorporated into most modern vehicles. The tire pressure sensors typically send a wireless signal to a control. The signal will typically include a code, such that the control can identify to which tire the particular signal relates.

Such tire pressure monitoring systems require some way of initially identifying the code for each sensor and its associated tire with a control. Thus, means for "localization" are incorporated into tire pressure monitoring systems.

One proposed system looks at characteristics in the signal that would be distinct for each of the tire based sensor transmitters. As an example, due to the relative location of the receiver and the control and each of the sensors on each of the tires, there would be distinct "black spots" within the signal at which the receiver would not receive a portion of the signal. The pattern of black spots could thus be of value in identifying the location of the particular sensor sending the particular signal. A receiver could be programmed to expect a particular series of black spots at particular times, and identify which tire is reporting based upon those black spots. However, the speed of the vehicle would affect the expected timing of the black spots within the signal. Thus, the prior art discussed above is not a practical way of identifying the location of a sensor sending a particular transmission.

SUMMARY OF THE INVENTION

In a disclosed embodiment of this invention, a signal is transmitted from sensors associated with each of the tires when a control is in a "learn" mode. This signal has a frequency that is adjusted to be corrected for vehicle speed. The frequency is equal to some constant multiplied by the speed of the vehicle such that the frequency of the transmission of the signal is relatively constant. In this manner, the receiver for a control can receive the signal and compare it to expected "black" spots for a signal from each of the tires. The receiver thus identifies the source of each signal.

In a most preferred embodiment, the signal is amplitude modulated and the receiver includes an amplitude peak detector for receiving the signal. The signal is preferably imposed upon the transmission from the tire pressure sensors for at least one, and preferably several, rotations of each tire every time the vehicle has stopped for at least a pre-determined period of time.

These and other features of this invention can be best understood from the following specification and drawings, the following of which is a brief description.

DETAILED DESCRIPTION OF THE PREFERRED EMBODIMENT

Figure 1:
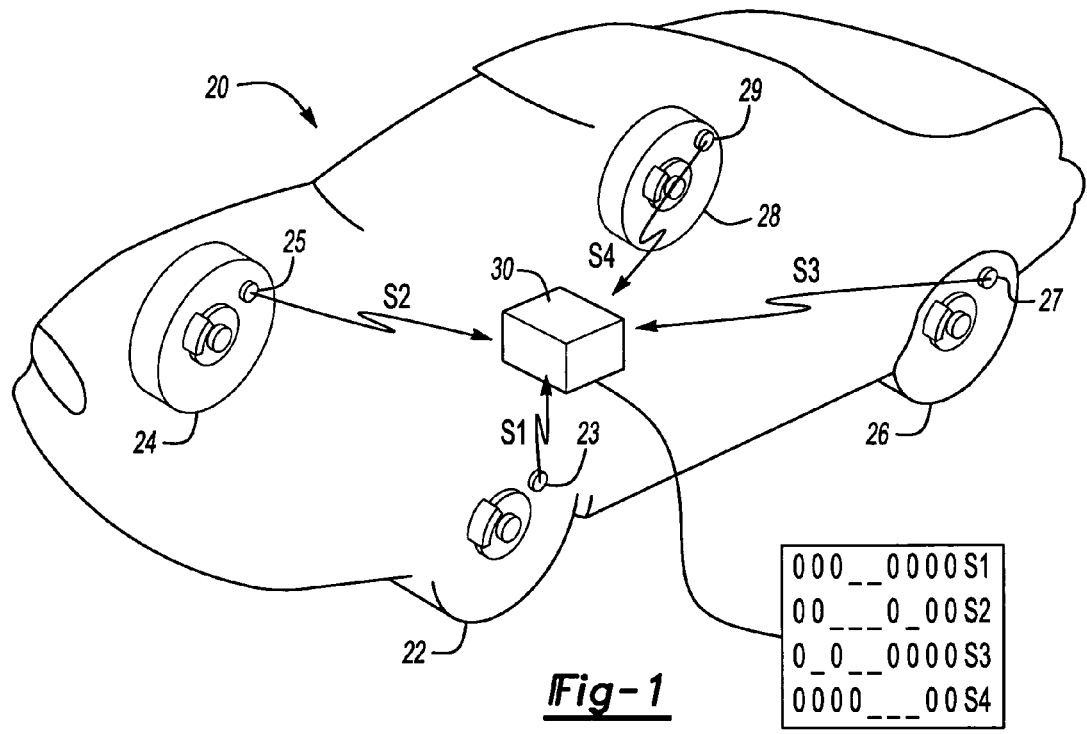
FIG. 1 is a schematic view of the system incorporating the present invention.
Figure 2:
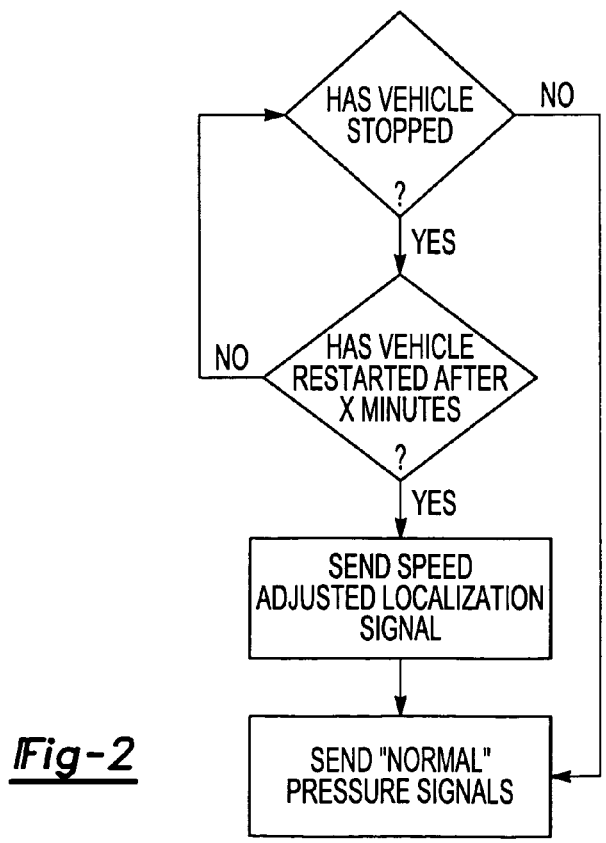
FIG. 2 is a flowchart.

A vehicle 20 is illustrated in FIG. 1 having four tires 22, 24, 26 and 28. The tires have tire pressure monitoring sensors and transmitters 23, 25, 27 and 29. Each of these sensors/transmitters transmit signals S1, S2, S3 and S4.

All of the signals S1–S4 are received by a common receiver and control 30. Control 30 must be capable of receiving the signals S1–S4 and looking at embedded codes unique to the sensors 23, 25, 27 and 29. Each code is stored at the control such that when subsequent signals are received, the control can identify which tire is associated with a particular signal.

As also shown in FIG. 1, the signals S1–S4 have a unique sequence of zeros and "black spots" at any one speed. The unique sequence is based upon the geometry of the vehicle, the relative location of the tires and the receiver, etc. For a particular vehicle design, a control can be programmed to expect a particular sequence for each of the four tire locations. Thus, the control 30 could be programmed with the sequence such as shown in the box in FIG. 1. Of course, the illustrated sequences are simply examples made for an understanding of this invention. Actual sequences would be determined experimentally or by prediction once a particular vehicle design has been finalized.

The present invention makes a practical application of these sequences to identify the location of each of the sensors by correcting the frequency of the transmission for changing vehicle speeds. Many of the known pressure sensors in the tires also contain a speed sensor to determine vehicle speed. Essentially, location signals are sent by the sensors 23, 25, 27, and 29 as an AM signal having a frequency proportional to the speed of the vehicle. Thus, the frequency is equal to some constant times the speed of the vehicle. As the speed increases, the frequency of transmission increases. The adjustment occurs at the sensor/transmitter. This correction for speed should ensure that the sequence will be generally the same for each of the tires, regardless of changes in vehicle speed.

Most preferably, the AM signal being sent at the speed dependent frequency need only be sent for at least one or perhaps a few rotations of each tire after the vehicle has been stopped for a predetermined period of time. Each time the vehicle has stopped for a predetermined period of time, on the order of at least several minutes, it is desirable to relearn the codes. This anticipates that during the stoppage of the vehicle, the tires may have been rotated, replaced, etc.

After the termination of this identification signal, the transmitter would return to its normal transmission of the tire pressure signal information. Typically, the tire pressure information is sent periodically, and includes an identifier code along with pressure information. The control 30 will have stored the identifier code that is also part of the identification signal.

Although a preferred embodiment of this invention has been disclosed, a worker of ordinary skill in the art would recognize that certain modifications would come within the scope of this invention. For that reason, the following claims should be studied to determine the true scope and content of this invention.

What is claimed is:

1. A tire pressure monitoring system comprising:
a plurality of tire pressure sensor/transmitters;
a receiver and control for receiving signals transmitted by each of said tire pressure sensor/transmitters;
said tire pressure sensor/transmitters including the ability to send an identification signal; and
a control associated with said sensor/transmitters monitoring vehicle speed, and a frequency of transmission of said identification signal being adjusted at said tire pressure sensors/transmitters to be dependent upon said monitored vehicle speed.

2. The system as set forth in claim 1, wherein said identification signal is an AM signal which has a frequency equal to some constant multiplied by said monitored vehicle speed.

3. The system as set forth in claim 1, wherein said identification signal is only sent when the vehicle has been stopped for a predetermined period of time.

4. The system as set forth in claim 1, wherein said identification signal is only transmitted for a predetermined number of revolutions of each tire after beginning transmission.

5. The system as set forth in claim 1, wherein said identification signal includes an identifying code, and said tire pressure sensor/transmitters further periodically sending tire pressure signals also including said identifying code.

6. The system as set forth in claim 1, wherein said control has the ability to learn a location of each of said sensors/transmitters based upon an expected change in a signal sent from said tire pressure sensors/transmitters, and a speed adjusted identification signal being sent periodically by said tire pressure sensors/transmitters to said control such that said control can relearn an expected change for each of the tire pressure sensors/transmitters locations.

7. The system as set forth in claim 6, wherein said expected feature of said signal is blank spots in the signals.

* * * * *